United States Patent [19]

Bucalo et al.

[11] Patent Number: 5,586,168
[45] Date of Patent: Dec. 17, 1996

[54] APPARATUS INCORPORATING A CELLULAR TELEPHONE

[76] Inventors: Brian D. Bucalo, 1010 S. Ocean Blvd., Pompano, Fla. 33062; Louis R. Bucalo, 2167 N. Point, San Francisco, Calif. 94123; Peter M. Kash, 60 W. 57th St., New York, N.Y. 10019

[21] Appl. No.: 318,127

[22] Filed: Oct. 5, 1994

Related U.S. Application Data

[63] Continuation-in-part of Ser. No. 83,062, Jun. 25, 1993, Pat. No. 5,444,778.

[51] Int. Cl.$^6$ ..................................................... H04Q 7/32
[52] U.S. Cl. ............................ 379/59; 379/451; 379/428
[58] Field of Search ...................................... 379/426, 449, 379/452, 455, 428, 453, 437, 438, 58, 59, 61; 455/89, 90, 54.1, 11.1, 127, 99, 20

[56] References Cited

U.S. PATENT DOCUMENTS

| | | | |
|---|---|---|---|
| 3,723,876 | 3/1973 | Seaborn, Jr. .................... | 455/54.1 X |
| 4,677,654 | 6/1987 | Lagin et al. ..................... | 379/58 |
| 4,698,838 | 10/1987 | Ishikawa et al. ................ | 379/58 |
| 4,868,862 | 9/1989 | Ryoichi et al. .................. | 455/90 |
| 4,989,230 | 1/1991 | Gillig et al. ..................... | 379/59 |
| 5,422,934 | 6/1995 | Massa ............................. | 379/58 X |

*Primary Examiner*—Curtis Kuntz
*Assistant Examiner*—Michael B. Chernoff
*Attorney, Agent, or Firm*—Steinberg, Raskin & Davidson, P.C.

[57] ABSTRACT

Cellular telephone apparatus having at least two pieces that are separated or separable such that the cellular antenna may be situated at a distance from the user during use. The cellular telephone apparatus has a cellular antenna which communicates with the user microphone and speaker via either a cordless phone type radio link or a cord. High frequency, electromagnetic radiation emitted from the cellular antenna is thereby substantially diminished by the time it reaches the phone user. The apparatus may include a portable carrying case, such as a conventional attache case to provide the utility of a business briefcase, a cellular telephone base unit situated within an interior space of the carrying case, a cellular antenna coupled to the base unit, a dial pad arranged on an exterior wall of the carrying case, and either a speaker phone unit arranged on the exterior wall of the carrying case, a communications unit coupled to the base unit so that the communications unit is positionable during use at a position away from the cellular antenna which is situated at the carrying case. The communications unit may be either a handset/microphone unit or a headset/microphone unit.

16 Claims, 7 Drawing Sheets

APPARATUS INCORPORATING A CELLULAR TELEPHONE

This application is a continuation-in-part of U.S. Ser. No. 08/063,062 filed Jun. 25, 1993, now U.S. Pat. No. 5,444,778.

BACKGROUND OF THE INVENTION

This invention relates generally to cellular telephone apparatus and, more particularly, to cellular telephone apparatus which reduce the intensity of electromagnetic radiation to which a user of the apparatus is exposed.

Recently, concerns have been expressed regarding the use of hand-held portable cellular telephones. In particular, it has been alleged that high frequency long-range electromagnetic radiation emitted from the antenna of cellular telephones may cause cancer. Due to the close proximity of the cellular telephone circuitry and antenna to the head of the user during operation of the telephone, the intensity of the electromagnetic radiation to which the user's head is exposed is quite high. For this reason individuals are refraining from using hand-held cellular telephones. In contrast, low power emissions from home cordless phones have not been linked to health problems.

In an effort to reduce exposure to electromagnetic radiation from cellular telephones, various shielding devices have been developed which deflect radiation emissions from the cellular telephone to a direction away from the user's body. However, these shielding devices have several drawbacks. For example, such shielding devices are not entirely effective in protecting the cellular telephone user from electromagnetic radiation emissions at close range since a certain degree of leakage generally occurs even from a shielded antenna. Attempts have also been made to provide shielding devices which direct the electromagnetic radiation emissions from a non-directional antenna to a desired direction away from the user's head. However, such devices generally adversely affect the performance of the cellular telephone due to the resulting highly directional nature of the electromagnetic radiation.

OBJECTS AND SUMMARY OF THE INVENTION

Accordingly, an object of the present invention is to provide new and improved cellular telephone apparatus.

Another object of the invention is to provide new and improved cellular telephone apparatus which reduces the intensity of the cellular telephone electromagnetic radiation to which the user is exposed.

Still another object of the present invention is to provide new and improved cellular telephone apparatus in which the intensity of the cellular telephone electromagnetic radiation to which the user is exposed is substantially reduced, and wherein the cellular telephone apparatus is easily manageable and not cumbersome in use.

In addition, an object of the present invention is to provide a cellular telephone apparatus for business and other use which does not require additional separate portable objects beyond a standard type briefcase.

A further object of the present invention is to provide new and improved cellular telephone apparatus which reduces the intensity of cellular telephone electromagnetic radiation to which the user is exposed, and wherein the performance of the cellular telephone is not adversely affected.

Briefly, in accordance with the present invention, these and other objects are attained by providing cellular telephone apparatus including a portable carrying case having means defining a substantially open interior space, means for opening and closing the interior space, and a cellular telephone base unit including electrical circuitry for the cellular telephone and a power source. The interior space of the carrying case encompasses substantially the entire interior of the carrying case. The cellular telephone base unit is preferably fixed against a back wall of the carrying case or is contained within a compartment formed within the walls of the carrying case. The antenna of the cellular telephone apparatus is coupled to the circuitry of the base unit, and may be of several forms including flip-up, fixed, extendable, telescoping or metal rim. The antenna may extend through the wall of the carrying case. A hand-held receiver unit for On-Off, speaking, listening, dialing, and other user functions is coupled to the circuitry of the base unit either by an elongated flexible cable or by a low power radio link similar to that used in home cordless phones. According to the invention, the flexible cable or radio link are sufficiently long such that during use the receiver unit may be situated at a location relatively remote from the carrying case containing the base unit and cellular antenna which emit potentially harmful cellular telephone electromagnetic radiation.

Thus, the present invention is based on the principle that the intensity of electromagnetic radiation emitted from the cellular telephone antenna placed at a location away from the user is substantially attenuated as it travels through the air. In particular, the intensity of electromagnetic radiation emitted from a cellular telephone antenna decreases in proportion to the inverse square of the distance from the source of the electromagnetic radiation, i.e. the circuitry/antenna.

The flexible cable may be wound around a spring loaded reel placed within the interior space or wall of the carrying case to facilitate paying out of the cable during use, and storage of the cable subsequent to use.

When not in use, the receiver unit and cellular antenna are situated within the interior of the carrying case. The receiver unit is accessible through an opening in the wall of the carrying case with the carrying case closed and positioned to lie either flat or upright. The flexible cable passes through the opening in the wall of the carrying case to permit a user to operate the receiver unit without having to open the carrying case.

The cellular telephone antenna is telescopable or otherwise extendable through the wall of the carrying case so as to be visible to the user when the carrying case is closed and positioned flat or upright. The antenna may also be permanently fixed to the case exterior or interior in an identifiable location so as to be separated from the receiver unit when in use.

In another embodiment of the present invention, a dial pad is situated on the exterior of the carrying case to enable the telephone to be activated without the need for opening the carrying case. The dial pad may have incorporated therein a security code to prevent unauthorized access and use of the telephone. In addition, speakerphone equipment is situated in an outside wall of the carrying case to enable a user to engage in a conversation without opening the carrying case.

Alternatively, instead of the speakerphone equipment, a compartment is arranged in the outside wall to open outward and contains a headset/microphone combination which is connected to the base unit of the telephone apparatus. Upon removal of the headset/microphone from the carrying case and placement on the head of the user, the telephone can be used in combination with the dial pad. The headset/microphone combination is attached by a long wire or by a wireless/cordless phone type radio link to the internal telephone circuitry contained within the carrying case.

In yet another embodiment of the present invention, the hand held unit consists of two linked but detachable pieces. One piece (piece A) is a cordless phone type apparatus with cordless phone circuitry and antenna, a microphone and ear speaker. The second piece (piece B) incorporates a cordless phone circuitry and an antenna which communicates with the cordless antenna in piece A when in use via a cordless phone radio link. Piece B also contains cellular phone circuitry and an antenna which is operatively connected to the cordless circuitry in piece B to permit voice communications from the cordless apparatus to be linked to the local cellular telephone network via the cellular phone antenna. Piece B containing the cellular antenna also contains a clip, or other similar attaching device, to attach piece B to another object such as a golf bag, briefcase or other item. The user detaches piece A from piece B prior to use and attaches piece B at a location remote from the user but within range of the cordless antenna.

BRIEF DESCRIPTION OF THE DRAWINGS

A more complete appreciation of the present invention and many of the attendant advantages thereof will be understood by reference to the following detailed description when considered in connection with the accompanying drawings, in which.

DETAILED DESCRIPTION OF THE INVENTION

Figure 1:
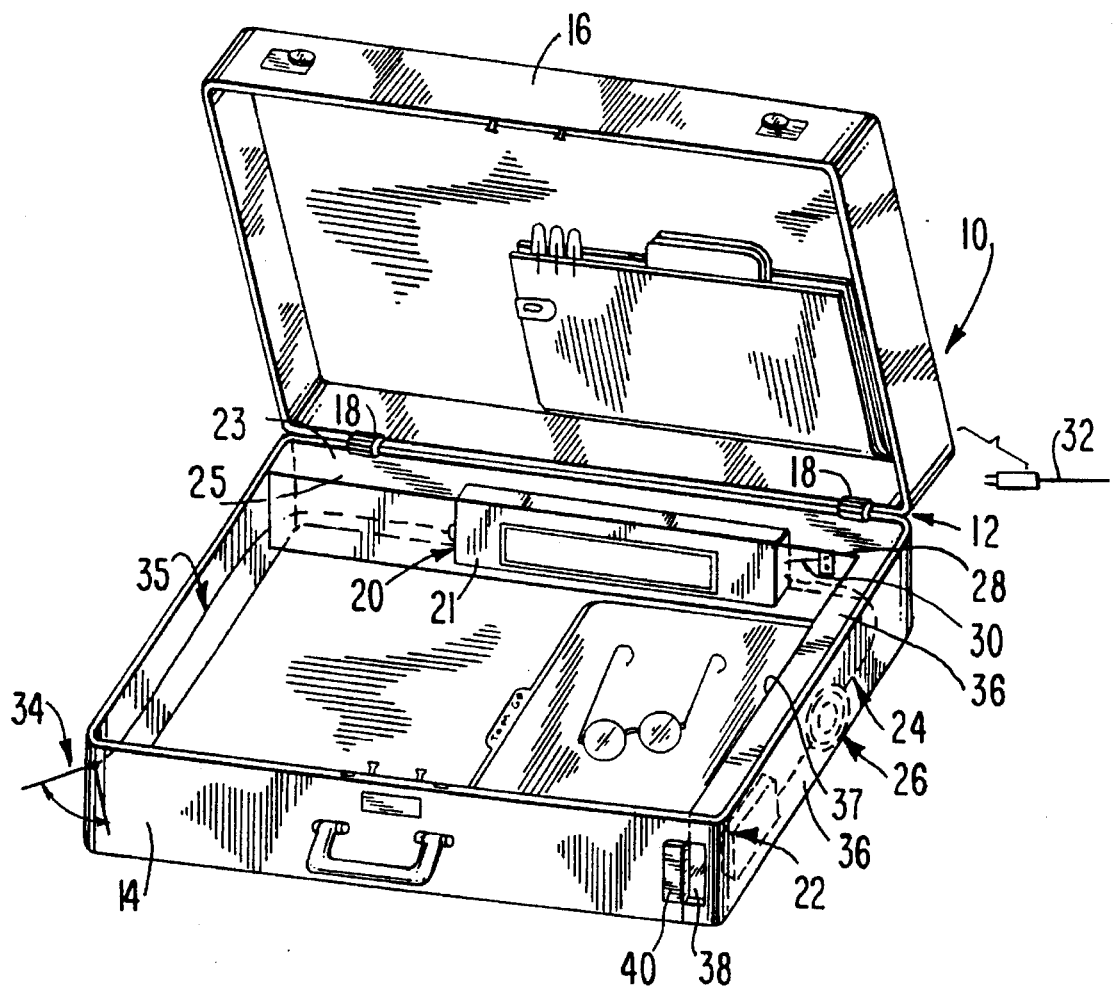
FIG. 1 is a perspective view of a first embodiment of cellular telephone apparatus in accordance with the invention.

Referring to the drawings wherein like reference characters designate identical or corresponding parts throughout the several views and more particularly to FIG. 1, cellular telephone apparatus according to a first embodiment of the invention, generally designated 10, comprises a portable carrying case 12 including a bottom case member 14 and a top cover member 16 connected to the case member 14 by means of hinges 18 and a cellular telephone including a base unit 20 having a housing 21 and a hand-held receiver 22 connected to base unit 20 by means of an elongated flexible cable 24 wound on spring tensioned take-up reel 26. In the illustrated preferred embodiment, the carrying case comprises a conventional business or attache case having an interior defined by the bottom case and top cover members 14, 16.

The base unit 20 is fixed within an interior space of case member 14 of carrying case 12, preferably within a compartment 23 formed in a back wall 25 thereof, and includes within housing 21 cellular telephone circuitry (not shown) and a rechargeable power source (not shown) for operating the circuitry. Power receptacle 28, mounted in the wall of case member 14 is connected via wire 30 to the rechargeable power source (not shown) within base unit 20. One end of a power cord 32 may be connected to power receptacle 28 and the other end of power cord 32 connected to a wall receptacle (not shown) to recharge the power source within base unit 20. Cellular antenna 34 may be on the exterior of case 12 as shown or situated within a wall of case 12 or within the interior of case 12. Wire 35 connects cellular antenna 34 to base unit 20.

The cable 24 has a length preferably in the range of between 3 to 10 feet and most preferably about 4 feet so that the receiver 22 can be situated at a location spaced apart from the location of the carrying case 12 in which the cellular telephone base unit 20 and antenna 34 are situated.

When not in use, the receiver 22 is situated hidden from view within an interior space of carrying case 12 in a compartment 36 formed inside a wall 37, although the interior space may also comprise the interior of the case itself. Alternatively, the receiver 22 may be mounted on an exterior surface of the carrying case 12 whereby the cable 24 passes through an aperture in the carrying case 12. Side wall compartment 36 has an opening 38 which is covered by cover 40. When it is desired to use the cellular phone, cover 40 is opened as shown in FIG. 1 and receiver 22 is lifted through opening 38. As receiver 22 is withdrawn, cable 24 is unwound from spring tensioned take-up reel 26, also situated in compartment 25, and extended 3 to 4 feet away from carrying case 12 containing antenna 34 to the extent permitted by length of cable 24. It is thus not necessary to open carrying case 12 to access receiver 22.

Figure 2:
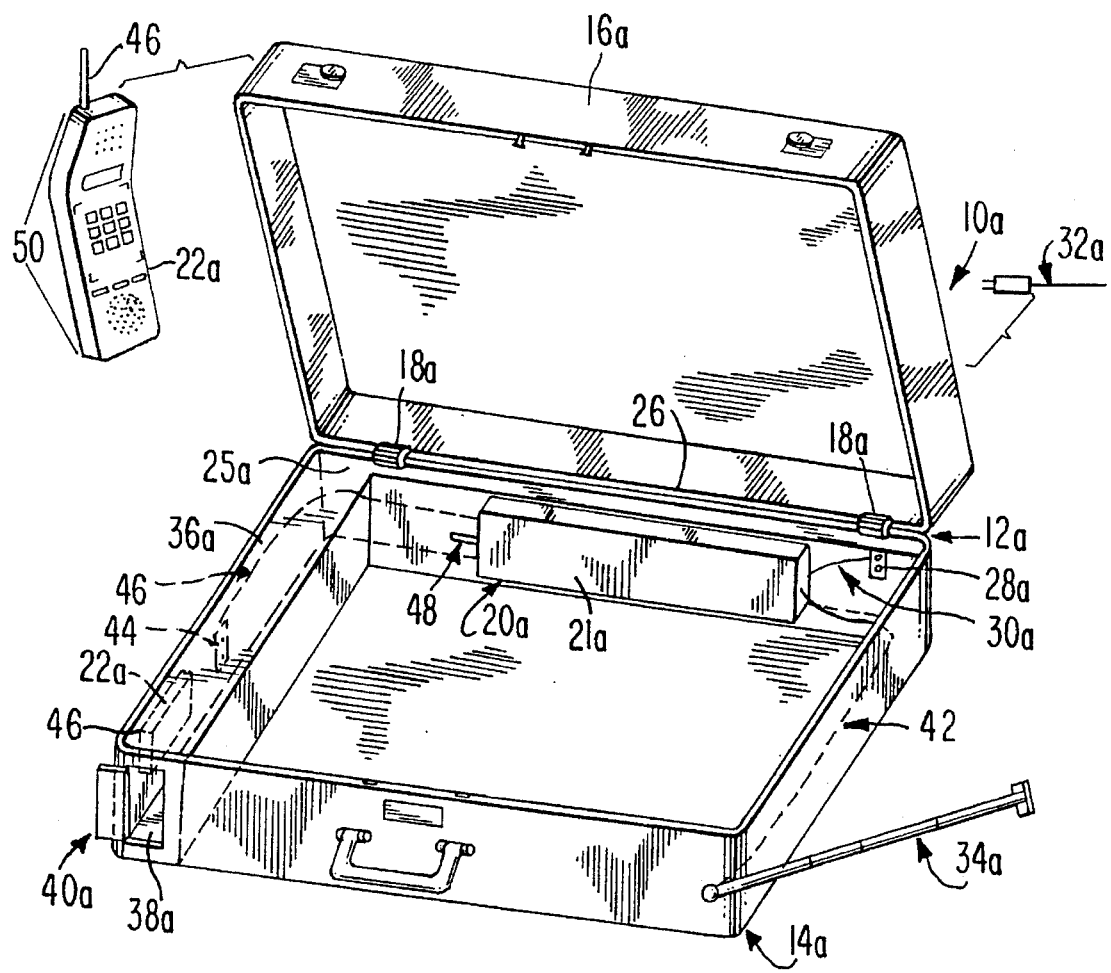
FIG. 2 is a perspective view of a second embodiment of cellular telephone apparatus in accordance with the invention.

Referring now to FIG. 2 wherein elements corresponding to elements described in connection with the FIG. 1 embodiment are designated by the same reference numerals with the suffix "a", cellular telephone apparatus 10a comprises a portable carrying case 12a including bottom case and cover members 14a and 16a pivotally connected to each other by means of hinges 18a. The base unit 20a is fixed within the case member 14a of the carrying case 12a preferably hidden from view within wall compartment 25a so as not to occupy interior space of carrying case 12a. Base unit 20a includes housing 21a, cellular telephone circuitry (not shown) and a rechargeable power source (not shown).

Power receptacle 28a mounted in the wall of case member 14a is connected by wire 30a to the rechargeable power source within base unit 20a. One end of power cord 32a may be connected to power receptacle 28a and the other end of power cord 32a to a wall receptacle (not shown) to recharge the power source within case unit 20a.

Cellular antenna 34a, mounted on the end of carrying case 12a may be of a fixed, flip-up, extendable or telescoping variety, and is connected to base unit 20a via wire 42. Alternatively, cellular antenna 34a may be fixed within or form an integral part of carrying case 12a as in the form of a metal rim.

When not is use, hand-held receiver unit 22a is situated within the interior space of carrying case 12a in wall compartment 36a. Receiver unit 22a when inside wall compartment 36a makes electrical contact with power jack 44 which is connected to base unit 20a by wires 46. In this manner, the internal rechargeable power source of receiver unit 22a (not shown) is recharged by contact with power jack 44.

When it is desired to use the cellular phone apparatus, cover 40a is lifted open, receiver 22a is grasped and lifted through opening 38a to be separated from carrying case 12a as shown in 50.

Receiver 22a incorporates a cordless phone antenna 46 through which a low power radio link similar to that used in home cordless phone is established with base unit 20a when in use. Base unit 20a incorporates a cordless phone base unit antenna 48 for communication with receiver unit 22a. Base unit antenna 48 may be located on the exterior of carrying case 12a, or within the wall of carrying case 12a or in the interior of carrying case 12a.

The low power home cordless phone radio link is lower in energy than that emitted by cellular antenna 34a and has not been associated with adverse health effects. The cordless phone radio link is effective for communication only over very short distances typically measured in feet. The cellular telephone antenna 34a with its more penetrating electromagnetic radiation output has a longer communication range typically measured in miles.

Figure 3:
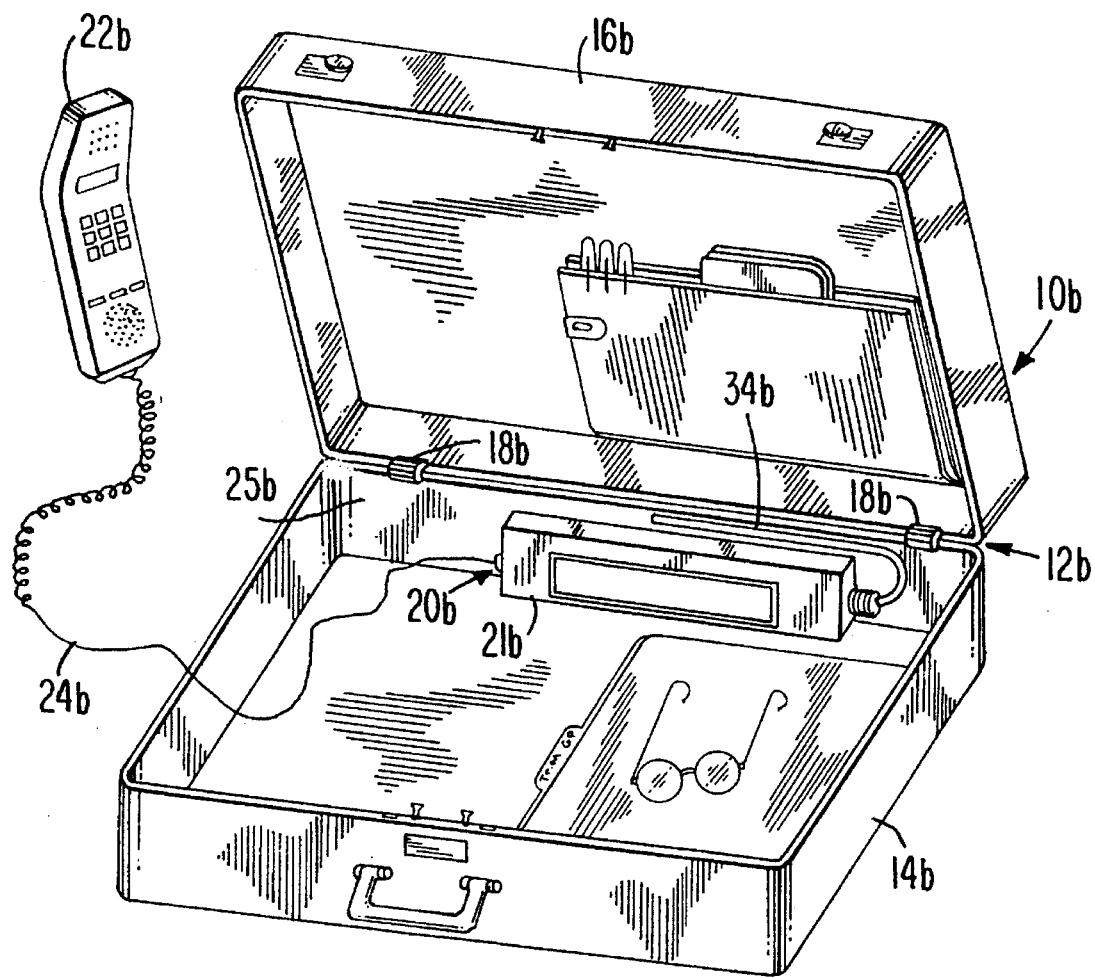
FIG. 3 is a perspective view of a third embodiment of cellular telephone apparatus in accordance with the invention.

Referring to FIG. 3 wherein elements corresponding to elements described in connection with the FIG. 1 embodiment are designated by the same reference numerals with the suffix "b", cellular telephone apparatus according to a third embodiment of the invention, generally designated 10b, comprises a portable carrying case 12b including a bottom case member 14b and a top cover member 16b connected to the case member 14b by means of hinges 18b, and a cellular telephone including a base unit 20b having a housing 21b and a hand-held receiver 22b connected to base unit 20b by means of an elongated flexible cable 24b.

The base unit 20b is fixed within the case member 14b of the carrying case 12b, preferably against the back wall 25b thereof, and includes within housing 21b cellular telephone circuitry (not shown) and a power source (not shown) for operating the circuitry. An antenna 34b is fixed within the carrying case 12b as shown in FIG. 3 or may be located on the cover member 16b, or pass through an opening (not shown) in the wall of bottom case member 14b and be fixed to an exterior surface of the carrying case 12b.

The cable 24b has a length, preferably in the range of between 3 to 15 feet, and most preferably about 4 to 10 feet, so that the receiver 22b can be situated at a location spaced away from the location of the carrying case 12b in which the cellular telephone base unit 20b and antenna 34b are situated. The cable 24b may be loosely situated within the interior of case 12b when not in use.

When not in use, the receiver 22b is situated within an interior space of carrying case 12b comprising the interior defined by case member 14b and cover member 16b in their closed positions. When it is desired to use the cellular telephone, the carrying case 12b is opened by pivoting cover member 16b to its open position shown in FIG. 3, withdrawing the hand-held receiver 22b from the interior of the carrying case, and preferably making the telephone call from a location spaced away, e.g. 4 feet away, from the base unit-containing carrying case 12b to the extent permitted by the length of the cable 24b. In the case where the antenna 34b is situated within the interior space of the carrying case 12b, the latter preferably remains in its open position shown in FIG. 3 during the telephone call to facilitate reception. In the case where the antenna 34b passes through an opening in the side wall of the carrying case, the portable carrying case 12b may remain in its closed position during use of the cellular telephone apparatus.

It is seen from the foregoing that cellular telephone apparatus is provided in which the hand-held receiver can be spaced from the telephone base unit which includes the cellular telephone circuitry and power source, and from the cellular antenna, a distance which is sufficient such that the intensity of the electromagnetic radiation emitted from the cellular antenna is substantially attenuated by virtue of its passage through the air by the time it reaches and is incident upon the user of the telephone. The invention provides all the utilities of a business briefcase in addition to the convenience and safety of cellular telephone apparatus which substantially reduces the intensity of cellular telephone electromagnetic radiation incident on the user and whose operation is not impeded despite the attenuation of the cellular electromagnetic radiation in the direction of the user.

Although the apparatus in accordance with the present invention is shown in a briefcase, it is understood that the cellular telephone base unit can be incorporated into any type of carrying case, such as a satchel, purse or even a simple box. The carrying case may be rigid or flexible so long as it can protect the delicate telephone apparatus and connections.

Figure 4:
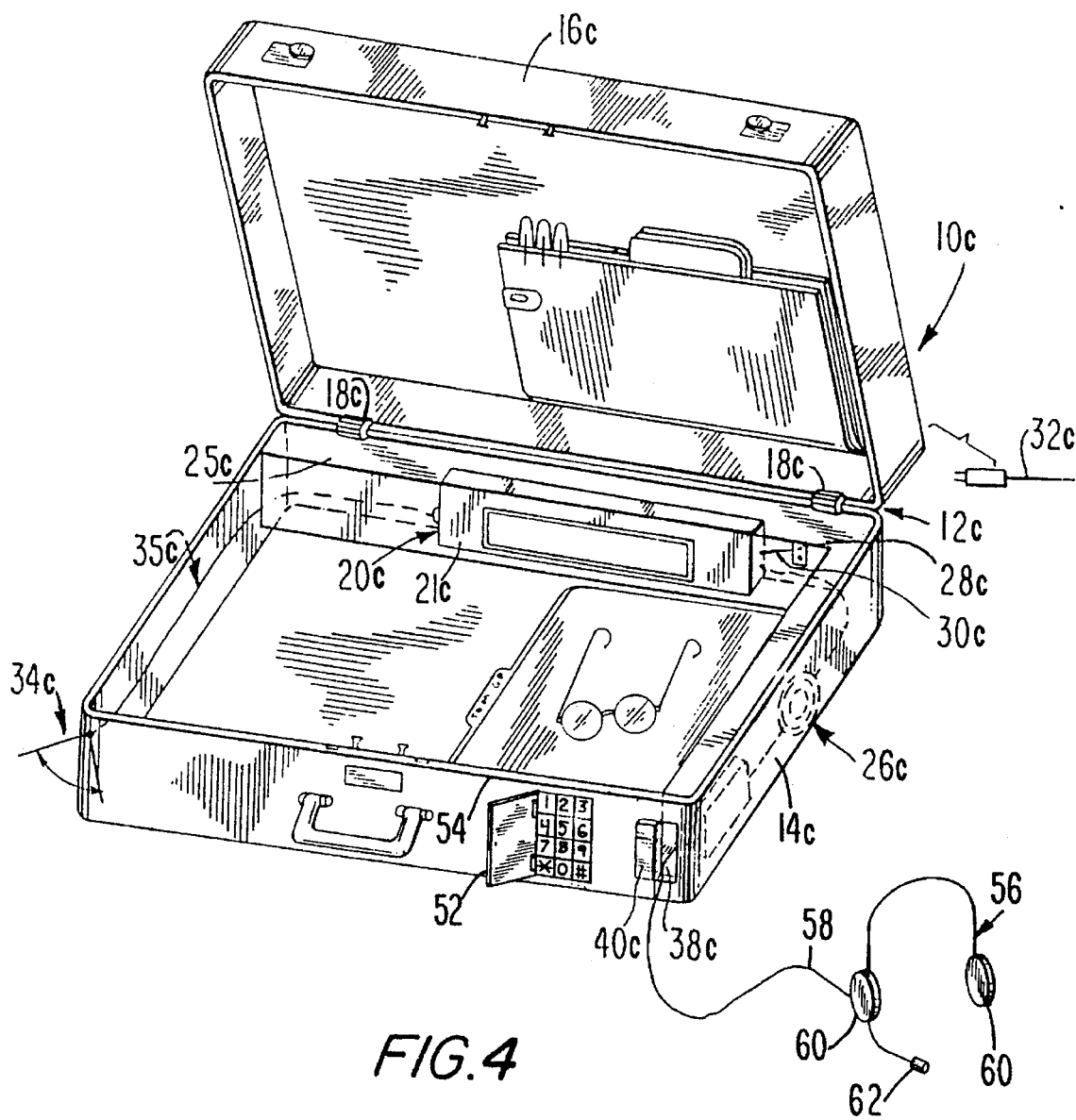
FIG. 4 is a perspective view of a fourth embodiment of cellular telephone apparatus in accordance with the invention in which a dial pad in arranged on an outside wall of the carrying case to be used in conjunction with a handset/microphone unit.
Figure 4A:
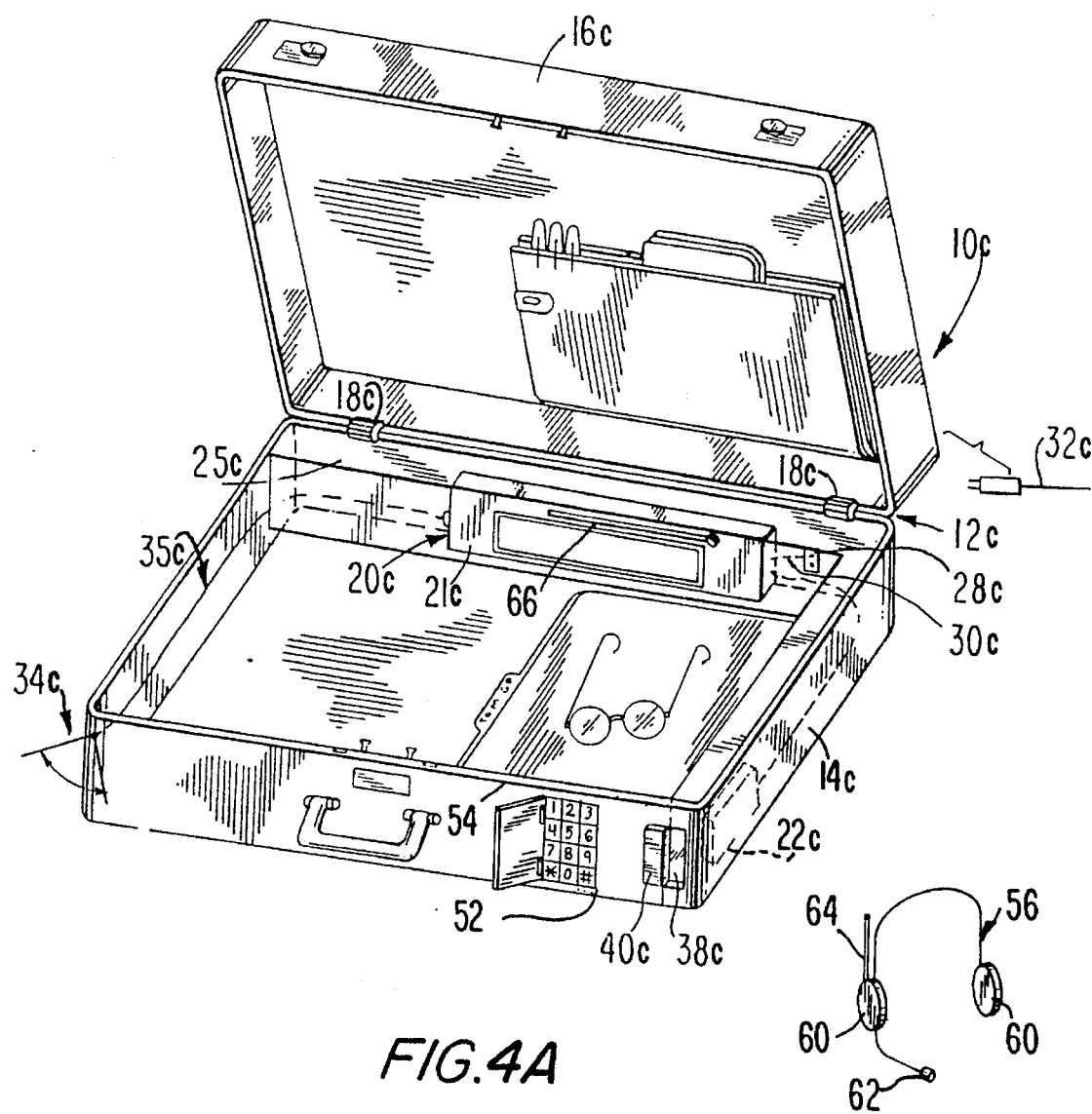
FIG. 4A is a perspective view of an alternative embodiment of the cellular telephone apparatus shown in FIG. 4.

Referring to FIGS. 4 and 4A, wherein the elements corresponding to elements described in connection with the FIG. 1 embodiment are designated by the same reference numerals with the suffix "c", cellular telephone apparatus 10c comprises a portable carrying case 12c including bottom case member 14c and cover member 16c pivotally connected to each other by means of hinges 18c. A base unit 20c is fixed within the case member 14c of the carrying case 12c preferably hidden from view within a wall compartment 25c so as not to occupy the interior space of carrying case 12c. Base unit 20c includes housing 21c, cellular telephone circuitry (not shown) and a rechargeable power source (not shown). In the illustrated preferred embodiment, the carrying case comprises a conventional business or attache case having an interior defined by the bottom case and top cover members 14c, 16c.

Power receptacle 28c is mounted in a wall of case member 14c and is connected by wire 30c to the rechargeable power source within base unit 20c. One end of power cord 32c may be connected to power receptacle 28c and the other end of power cord 32c to a wall receptacle (not shown) to recharge the power source within base unit 20c.

Cellular antenna 34c, mounted on the end of carrying case 12c may be of a fixed, flip-up, extendable or telescoping variety, and is connected to base unit 20c via a wire 35c. Alternatively, the antenna 34c may be fixed within or form an integral part of the carrying case 12c, e.g., as in the form of a metal rim.

As shown in FIGS. 4 and 4A, a dial pad 52 is positioned on an exterior wall of the carrying case 12c so that it is accessible without having to open the carrying case. A cover 54 may be provided in the exterior wall to cover the dial pad and maintain its cleanliness. The dial pad 52 is connected to the base unit 20c via a wire and operates so that telephone calls can be initiated by pressing buttons thereon. The dial pad may also incorporate a security code to prevent unauthorized access and use.

A handset/microphone unit 56 is situated, when not in use, within the interior space of carrying case 12c in wall compartment 36c. The handset/microphone unit 56 has at least one ear piece 60, preferably two, one for each ear of the telephone operator, and a mouthpiece 62 which is placed in the vicinity of the mouth of the user. By arranging the handset/microphone unit on the user's head, it is possible to operate the telephone, in conjunction with the dial pad, so that the carrying case 12c does not have to be opened and further so that the antenna 34c is removed a distance from the user.

In the embodiment shown in FIG. 4, the handset/microphone unit 56 is connected by a long wire 58 to the base unit 20c in which the necessary circuitry for using the handset/microphone is located. The wire 58, by means of which the handset/microphone unit 56 is connected to the base unit 20c, is an elongated flexible cable wound on spring tensioned take-up reel 26c. The necessary circuitry to operate the handset/microphone unit 56 is preferably placed in the base unit 20c. When the cellular phone apparatus is being used, cover 40c is lifted open, handset/microphone unit 56 is grasped and lifted through opening 38c as the wire 58 unwinds from the reel 26c. The handset/microphone 56 is placed on the head of the user so that one ear piece 60 fits over each ear and the mouthpiece 62 is in the vicinity of the mouth of the user. In this manner, not only can a telephone connection be established without opening the carrying case 12c, but also the potentially harmful emissions from the cellular telephone apparatus, i.e., antenna, 34c are further distanced from the user.

In the embodiment shown in FIG. 4A, the handset/microphone unit 56 incorporates; a cordless phone antenna 64 (and related circuitry) through which a low power radio link similar to that used in home cordless phone is established with base unit 20c when in use. In this embodiment, a long wire connecting the handset/microphone unit 56 to the carrying case 12c is not required. Base unit 20c incorporates a cordless phone base unit antenna 66 for communication with the handset/microphone unit 56. Base unit antenna 66 may be located on the exterior of carrying case 12c, or within the wall of carrying case 12c or in the interior of carrying case 12c. The handset/microphone unit 56 and the base unit 20c include receiving and transmitting circuitry to enable the low power radio link to function and convey voice data between the handset/microphone unit 56 and the base unit 20c.

The handset/microphone 56 is, when not in use, placed in compartment 22c to be recharged, if needed by the appropriate circuitry. In this embodiment, the unit 56 is lightweight and small so that it can be used in a variety of ways. For instance, the cellular apparatus could be placed in a golf bag and the unit 56 carried with the golfer during his round of golf.

The low power home cordless phone radio link from the unit 56 to the carrying case is lower in energy than that emitted by cellular antenna 34c and has not been associated with adverse health effects. The cordless phone radio link is effective for communication only over very short distances typically measured in feet. The cellular telephone antenna 34c with its more penetrating electromagnetic radiation output has a longer communication range typically measured in miles.

Figure 5:
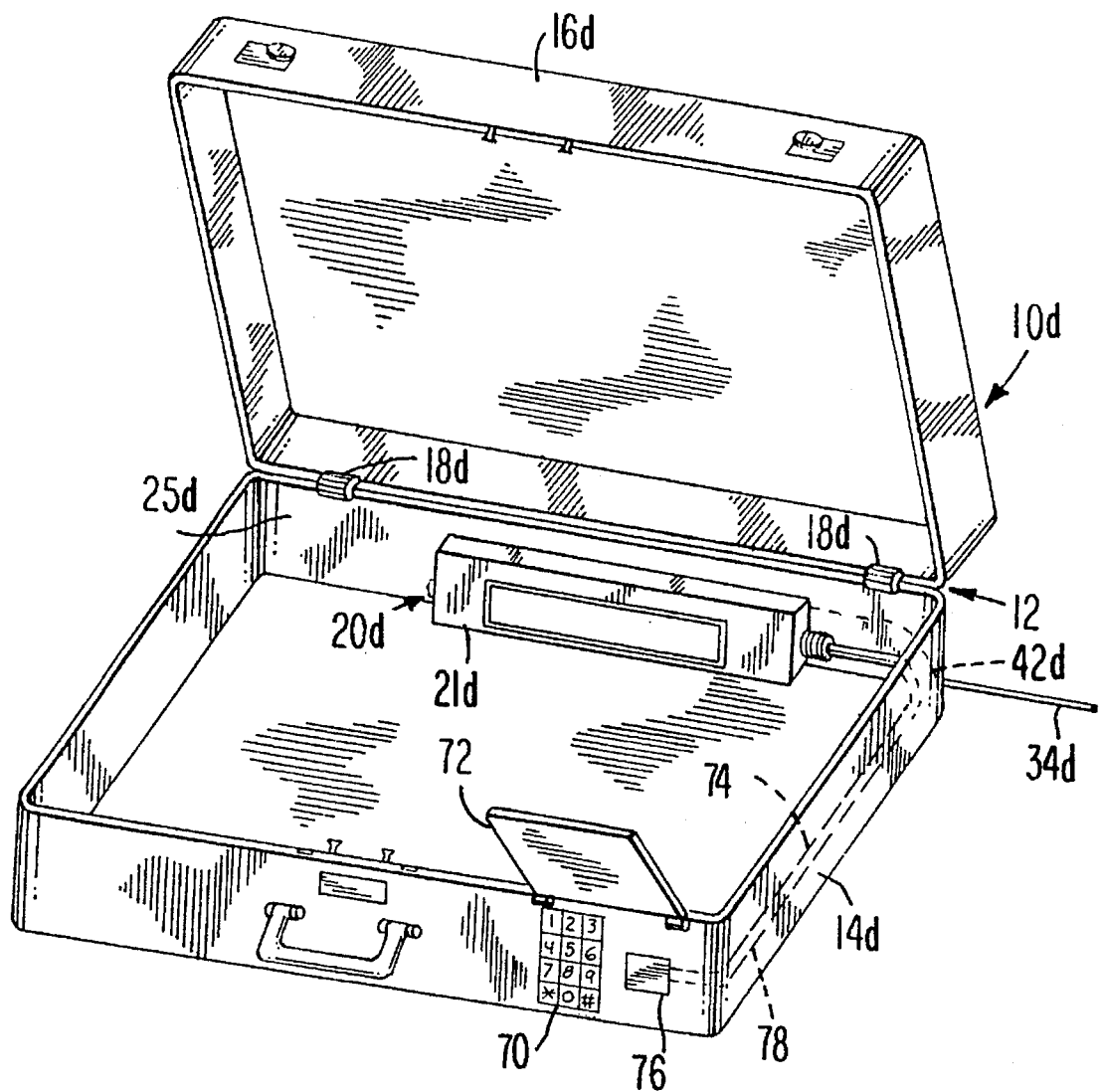
FIG. 5 is a perspective view of a fifth embodiment of cellular telephone apparatus in accordance with the invention in which a dial pad and speakerphone are arranged on an outside wall of the carrying case.

Referring to FIG. 5, wherein elements corresponding to elements described in connection with the FIG. 1 embodiment are designated by the same reference numerals with the suffix "d", cellular telephone apparatus 10d comprises a portable carrying case 12d including bottom case member 14d and cover member 16d pivotally connected to each other by means of hinges 18d. A base unit 20d is fixed within the case member 14d of the carrying case 12d preferably hidden from view within a wall compartment 25d so as not to occupy the interior space of carrying case 12d. Base unit 20d includes housing 21d, cellular telephone circuitry (not shown) and a rechargeable power source (not shown).

Cellular antenna 34d, mounted on the end of carrying case 12d may be of a fixed, flip-up, extendable or telescoping variety, and is connected to base unit 20d via a wire 42d. Alternatively, the antenna 34d may be fixed within or form an integral part of the carrying case 12d, e.g., as in the form of a metal rim.

As shown in FIG. 5, a dial pad 70 is positioned on an exterior wall of the carrying case 12d so that it is accessible without having to open the carrying case. The dial pad 70 is connected to the base unit 20d via a wire 74 and operates so that telephone calls can be initiated by pressing buttons thereon. The dial pad 70 may also incorporate a security code to prevent unauthorized access and use and may be either numeric and/or alphanumeric.

A speakerphone unit 76 is also arranged on an exterior wall of the carrying case 12d and is connected by a wire 78 to the base unit 20d. A cover 72 may be provided in the exterior wall to cover the dial pad 70 and/or the speakerphone unit 76 when not in use to maintain their cleanliness. As known in the art, the speakerphone unit 76 comprises a microphone which functions as the mouthpiece of the telephone and a receiver which functions as the ear piece of the telephone. In this manner, the receiving and transmitting functions of a telephone are provided.

The telephone is operated by dialing the desired telephone number on the dial pad 70 and speaking into the speakerphone unit 76. The antenna 34d is in its extended position and can be located at a distance from the user since it is possible to speak into a speakerphone unit from a distance. This arrangement enables the user to avoid the potentially harmful emissions from the cellular telephone apparatus.

Figure 6:
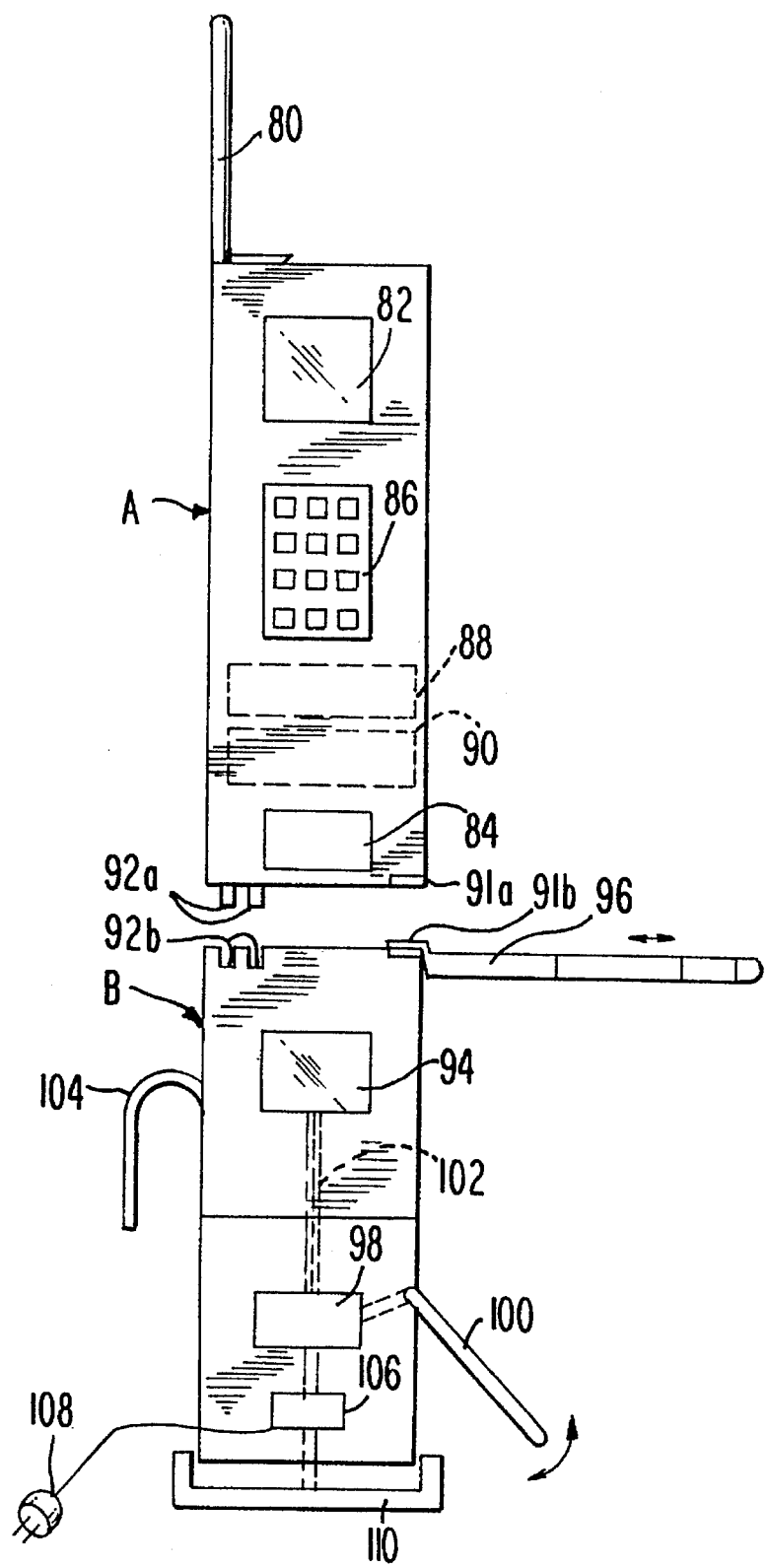
FIG. 6 shows a sixth embodiment of the present invention in which the apparatus consists of two pieces detachable from one another.

Referring to FIG. 6, the embodiment of the present invention consisting of two detachable pieces is shown. Piece A is illustrated as a cordless phone apparatus incorporating a cordless phone antenna 80, ear speaker (receiver) 82, microphone 84 and dial pad 86, internal cordless phone circuitry 88 and battery 90. The battery may be of the rechargeable or non-rechargeable type. Piece A is operatively connected to piece B when not in use by a latching mechanism 91a,91b. A power plug 92a,92b is arranged at the connection between piece A and piece B to enable recharging the internal battery 90 of piece A.

Piece B is shown as a two-part apparatus containing both cordless phone circuitry 94 and a cordless phone antenna 96, as well as cellular phone circuitry 98 and cellular antenna 100. Cordless phone antenna 96 and cellular antenna 100 may be selected from a variety of conventional antennas. In this embodiment, cordless antenna 96 is a telescoping antenna and cellular antenna 100 is a flip-out type of antenna. Cordless antenna 96 in piece B communicates with the cordless antenna 80 in piece A when in use via a cordless phone radio link. The cordless phone circuitry 94 in piece B is operatively connected via internal wire connections 102 to the cellular phone circuitry 98 to permit voice communications from piece A to be ultimately linked during use to the local cellular telephone network via the cellular phone antenna 100. The two different circuitry systems of piece B may be configured together on the same circuit board or chip. Piece B may also be formed of one-piece including both the cordless telephone circuitry and cellular telephone circuitry. An internal battery 106 of the rechargeable type or non-rechargeable type is located in the interior of piece B. The entire assembly of piece A and piece B are connected together when not in use and are connected to an external energy source which can take the form of a wire 108 leading to a wall socket or a recharger 110 to permit charging of the internal batteries 90 and 106.

Piece B also includes means to attach itself to another object, such as a golf bag, briefcase or other item. The attachment means may be a clip 104 as shown in FIG. 6 or other comparable means which can either permanently or temporarily hold piece B to the desired object. By means of this construction, piece A (the cordless phone) can be operated by the user a distance away from the cellular antenna 100 on piece B such that high frequency, electromagnetic radiation emitted from the cellular antenna 100 is substantially diminished by the time it reaches the user.

The examples provided above are not meant to be exclusive. Many other variations of the present invention would be obvious to those skilled in the art, and are contemplated to be within the scope of the appended claims.

What is claimed is:

1. Cellular telephone apparatus, comprising:

a portable carrying case including means defining a substantially open interior space and means for opening and closing said interior space, said means defining said interior space including a back wall, said interior space of said carrying case encompassing substantially the entire interior of said carrying case;

a cellular telephone base unit including cellular telephone circuitry means and a power source for operating said circuitry means, said cellular telephone base unit being situated and fixed against said back wall or within said means defining said interior space such that said cellular telephone base unit does not occupy a significant portion of said interior space;

antenna means coupled to said base unit at said carrying case;

a dial pad arranged on an exterior wall of said carrying case and connected to said base unit;

a communications unit having an earpiece and a mouthpiece; and means for coupling said base unit and said communications unit into communication with each other with said communications unit positionable during use spaced away from said antenna means of said carrying case.

2. Cellular telephone apparatus as recited in claim 1, wherein said antenna means are situated within said interior space of said carrying case.

3. Cellular telephone apparatus as recited in claim 1, wherein said antenna means are situated outside of said carrying case.

4. Cellular telephone apparatus as recited in claim 1, wherein said antenna means are situated within a wall of said carrying case.

5. Cellular telephone apparatus as recited in claim 1, wherein said portable carrying case comprises a business briefcase thereby providing all the utility of a business briefcase and includes a bottom case member and a cover member hingedly connected to said bottom case member.

6. Cellular telephone apparatus as recited in claim 1, wherein said coupling means comprise an elongate flexible cable having first and second ends, said first end being coupled to said communications unit and said second end being connected to said base unit.

7. Cellular telephone apparatus as recited in claim 6, further including a reel device fixed within said carrying case for storing said flexible cable during non-use of said telephone apparatus and for paying out said flexible cable during use.

8. Cellular telephone apparatus as recited in claim 1, wherein said carrying case has an open position in which said interior space is accessible and a closed position, further comprising means for enabling the removal of said communications unit from said carrying case when said carrying case is in said closed position, said means comprising an opening formed in said carrying case communicating between said interior space thereof and the exterior, said communications unit being structured and arranged to pass through said opening.

9. Cellular telephone apparatus as recited in claim 1, wherein said communications unit is stored in a compartment formed in a wall of said carrying case.

10. Cellular telephone apparatus as recited in claim 1, wherein said communications unit is situated within said interior space of said portable carrying case during non-use of said telephone apparatus.

11. Cellular telephone apparatus as recited in claim 1, further comprising a cover attached to said exterior wall to cover said dial pad and/or said communications unit.

12. Cellular telephone apparatus as recited in claim 1, wherein said coupling means comprise a radio link including transmitter and receiver means coupled to said base unit and said communications unit.

13. Cellular telephone apparatus as recited in claim 1, wherein said communications unit is selected from the group consisting of a handset/microphone unit and a headset/microphone unit.

14. Cellular telephone apparatus, comprising:

a portable carrying case including means defining a substantially open interior space and means for opening and closing said interior space, said means defining said interior space including a back wall, said interior space of said carrying case encompassing substantially the entire interior of said carrying case;

a cellular telephone base unit including cellular telephone circuitry means and a power source for operating said circuitry means, said cellular telephone base unit being situated and fixed against said back wall or within said means defining said interior space such that said cellular telephone base unit does not occupy a significant portion of said interior space;

antenna means coupled to said base unit at said carrying case;

a dial pad arranged on an exterior wall of said carrying case and connected to said base unit;

a speakerphone unit comprising voice receiving means and voice transmission means; and means for coupling said base unit and said speakerphone unit into communication with each other.

15. Cellular telephone apparatus as recited in claim 14, wherein said speakerphone unit is arranged on said exterior wall of said carrying case.

16. Cellular telephone apparatus as recited in claim 14, further comprising a cover attached to said exterior wall to cover said dial pad and/or said speakerphone unit.

\* \* \* \* \*